June 13, 1967 J. C. CUMMING 3,324,975
BRAKE MECHANISMS
Filed June 28, 1965 2 Sheets-Sheet 1
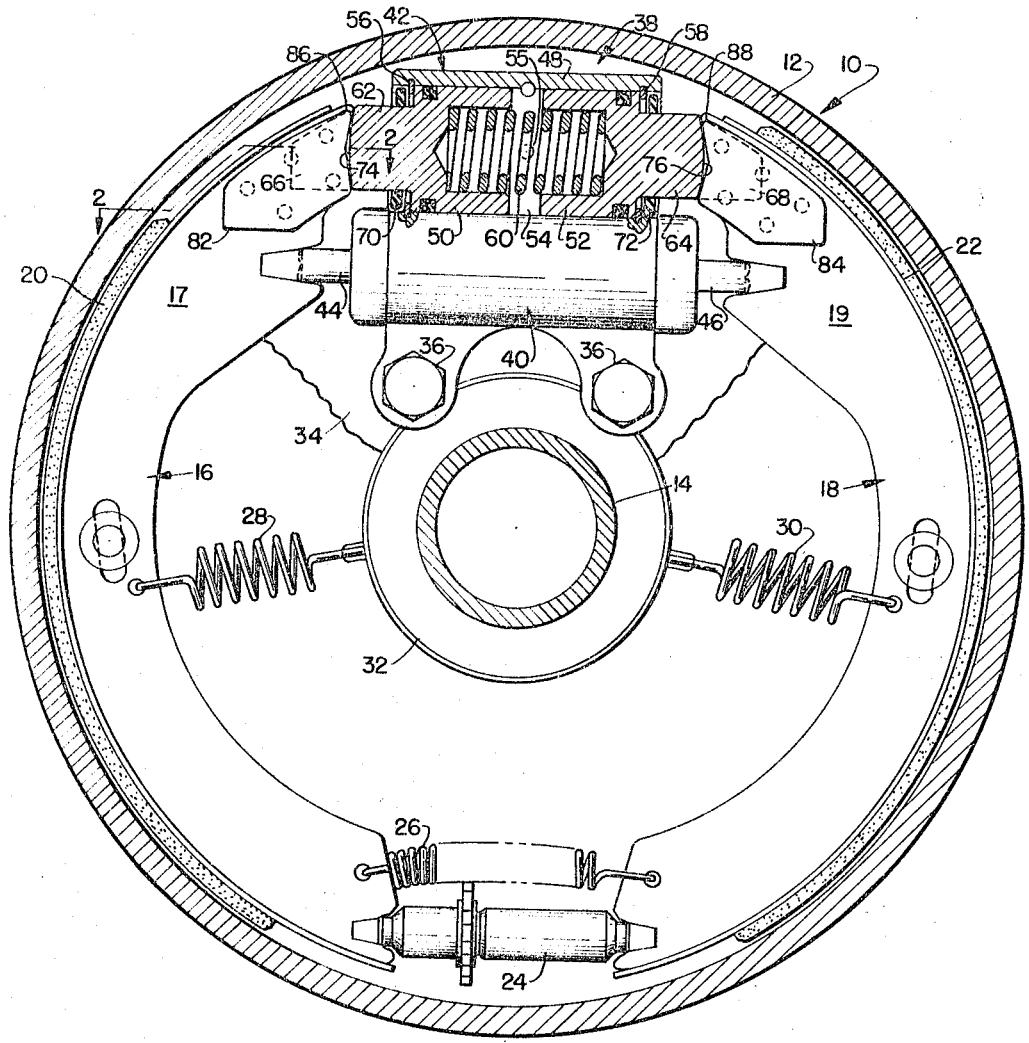
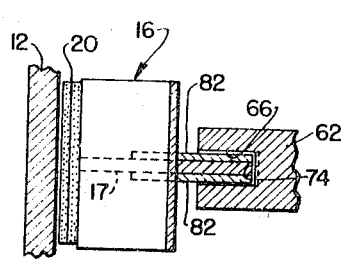
INVENTOR
JAMES C. CUMMING
Strauch, Nolan, Neale,
Nies and Bronaugh
ATTORNEYS June 13, 1967  J. C. CUMMING  3,324,975
BRAKE MECHANISMS
Filed June 28, 1965 2 Sheets-Sheet 2
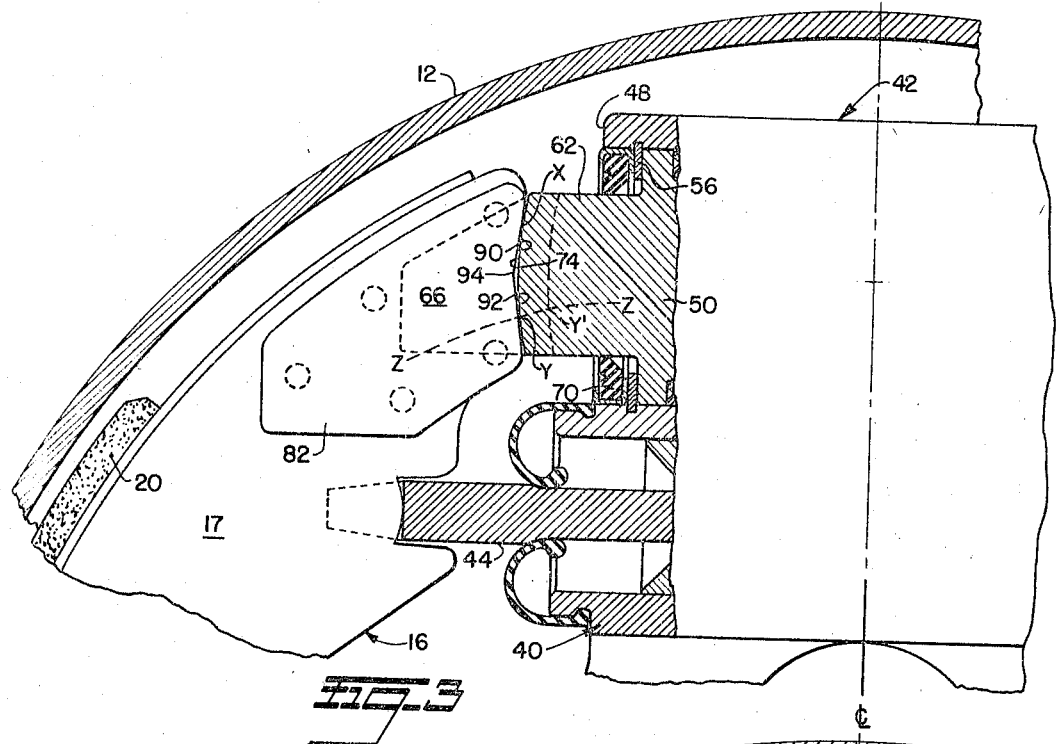
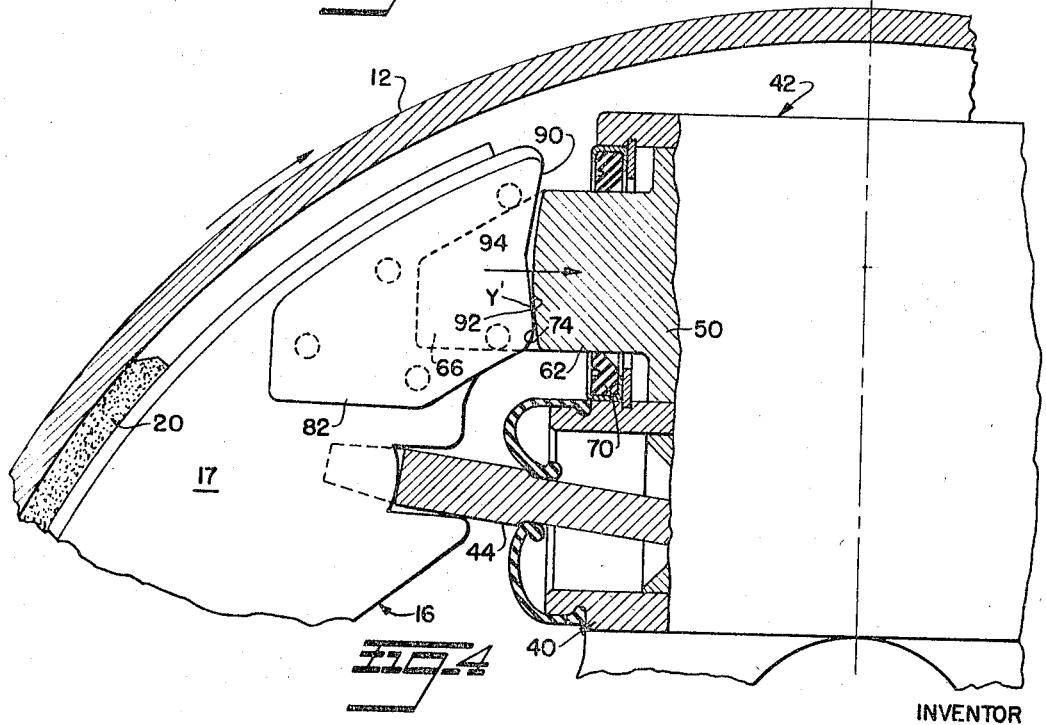
INVENTOR
JAMES C. CUMMING
Strauch, Nolan, Neale,
Nies and Bronaugh
ATTORNEYS 3,324,975
BRAKE MECHANISMS
James C. Cumming, Pleasant Ridge, Mich., assignor to Rockwell-Standard Corporation, Pittsburgh, Pa., a corporation of Delaware
Filed June 28, 1965, Ser. No. 467,347
4 Claims. (Cl. 188—78)

The present invention refers to brake mechanisms for automotive vehicles and more particularly to improvements in brake systems of the type in which the torque reaction derived from one or more brakes is utilized to operate the remaining brakes.

In such systems, as for example, disclosed in U.S. Patent 3,256,962, the brakes which embody the torque reaction power cylinders are constructed in such way that the normal brake application from the master cylinder and the ensuing torque reaction power application is effected at the same ends of the brake shoes. For this purpose a dual cylinder assembly is provided between the actuation ends of the brake shoes of which one is a wheel cylinder connected to the master cylinder for brake actuation and the other cylinder is a compression cylinder in which pressure is built up by the torque reaction derived from that brake to actuate the remaining brakes. When the brake is applied, the pistons of the wheel cylinder move outwardly to displace the brake shoes against the rotating brake drum. As the brake shoes come in contact with the drum, the friction forces developed between the shoes and the drum tend to shift the shoes circumferentially in the direction of drum rotation. Then, the tip of either the primary or secondary shoe (depending on the direction of rotation) moves the respective piston of the torque reaction power cylinder inwardly, thus pressurizing the fluid therein which pressure is then utilized to apply the other brakes.

In the brake shoes of the primary brakes which embody the torque reaction power cylinders according to the disclosure in the aforementioned Patent 3,256,962 the tips of the upper brake shoe actuating ends are formed to match and co-operate with correspondingly formed surfaces at the outer ends of the pistons of the torque reaction power cylinders against which they abut. At least one in each pair of these co-operating surfaces is rounded to compensate for slight pivotal rocking movements of the brake shoes.

In prior embodiments of this type of brakes it has been found that the pivoted connections between the brake shoe ends and the pistons of the torque reaction power cylinders was inadequate in that upon brake lining wear and subsequent adjustment of the brake shoes the predetermined point of contact at the pivot surfaces between brake shoe and piston became displaced which was highly undesirable and resulted, among other things, in uneven lining wear distribution due to the brake shoes being wedged into the brake drum. This condition is unsatisfactory for efficient brake performance and the present invention provides means by which this adverse condition will be remedied.

The point of contact between the shoe and the pistons of the torque reaction power cylinders is preferably close to or at the axial center of the piston and during actuation substantially follows the arc along which the brake drum is turning to assure even contact of the brake lining with the drum along the full surface of the lining. This relationship should be maintained throughout the full lining wear adjusting range for maximum brake performance which could not be achieved with the customary inclined slot construction since the brake shoes glided off center during brake actuation.

Accordingly, an important object of the present invention is the provision of means at the brake shoe actuating ends in torque reaction power wheel brakes which assure that the point of contact between the brake shoe ends and the pistons of the torque reaction power cylinders remains substantially at or near the axis of the piston as the brake shoes are moved outwardly during actuation and after lining wear adjustment.

Another object of the present invention resides in the provision of a brake shoe and cooperating piston which abut each other along surfaces so constructed that the brake shoe is always centered on the piston in a definite relation thereto.

A further object is to provide a brake shoe anchoring means on the piston of a wheel power cylinder adapted to be moved inwardly by the brake shoe upon brake application when the shoe is rotated with the drum which comprises cooperating surfaces, one of which is a slot curved outwardly on a radius whose center coincides with the center of the piston and the other surface of which provides an obtuse angle.

Other objects will become evident or specifically be pointed out in the following detailed description in connection with the attached drawings in which:

FIGURE 1 illustrates, partly in section, a torque reaction power brake construction embodying the present invention;

FIGURE 2 is a section through the brake shoe and power piston connection along line 2—2 of FIGURE 1;

FIGURE 3 is an enlarged fragmentary sectional view of one side of the brake shoe actuating ends of the brake in FIGURE 1 showing the brake in released position; and FIGURE 4 is a view similar to FIGURE 3 showing the brake in applied position.

With reference to FIGURES 1 and 2, the vehicle brake assembly 10 which may be either a front or rear wheel brake is of the general type disclosed in patent 3,256,962. As described in the co-pending application this particular brake system utilizes the ordinarily wasted brake reaction force of one set of wheel brakes to apply other sets of wheel brakes.

Brake assembly 10 includes a brake drum 12 adapted to rotate with the vehicle wheel (not shown) around the axle 14 of the vehicle. The drum encloses a brake mechanism comprising brake shoes 16 and 18 having webs 17 and 19 and brake linings 20 and 22, respectively, adapted to be brought in contact with drum 12 upon brake application. Brake shoes 16 and 18 are connected at one end to each other by an adjustable link 24 which serves to adjust the spacing of the brake shoes in relation to the drum after brake lining wear. A coil spring 26 holds the shoes in contact with the adjustable link 24.

Shoes 16 and 18 are provided with brake shoe return springs 28 and 30, respectively, which are attached to the shoes substantially midway between the ends and to a flange 32 attached to the axle 14 which carries the brake support plate 34.

Attached to the support plate 34 as by screws 36 is a dual cylinder cluster 38 comprising a lower service cylinder 40 and adjacent upper power cylinder 42 each positioned between the opposed ends of the brake shoes. The service cylinder 40 may be of conventional, known structure which includes pivotable piston connected plungers 44 and 46, respectively, extending outwardly of service cylinder 40 to be rockably connected to their respective brake shoes 16 or 18.

The adjacent power cylinder 42 comprises a housing 48 which may be integral with the housing of the service cylinder 40 and which contains opposed slidable pistons 50 and 52 which form between them a compression chamber 54 having an outlet 55 connected to the secondary brake system. Pistons 50 and 52 are normally constantly urged outwardly against lock rings 56 and 58 by an expansion coil spring 60 positioned between the pistons. The lock rings 56 and 58 limit the outward movement of the pistons so that they are allowed to move inwardly only upon application of external force as will be explained hereinafter.

The power cylinder pistons 50 and 52 have each a reduced diameter outer end 62 and 64, respectively, which extend outward of cylinder 42 and which are provided at their ends with vertical slots 66 and 68 for a purpose to appear. Seals 70 and 72 interposed between the outer ends 62 and 64 of the power pistons 50 and 52 and the cylinder housing 48 prevent the entry of moisture and dirt into the cylinder.

The bottom surfaces 74 and 76 of the slots 66 and 68 are curved outwardly on a common radius whose center is the center of the cylinder. The slots 66 and 68 are adapted to receive the extended ends of the brake shoes which in this particular instance may be provided with reinforcing plates 82 and 84, respectively welded to both sides of the brake shoe webs 17 and 19 (FIGURE 2) to reduce wear and prevent bending at the brake shoe web ends under high application forces.

With further reference to FIGURE 3 the ends of the reinforced brake shoe webs 17 and 19 are formed by straight surfaces 90 and 92 extending from a vertex point 94 in opposite directions in such fashion that when the brake shoe web ends are inserted in their respective slots 66 or 68, the surfaces 90 and 92 form tangents of the curved slot surfaces 74 or 76 respectively, at points $x$ and $y$, respectively. The surfaces 90 and 92 preferably extend at an angle of from six to eight degrees from a vertical through the vertex point 94 normal to the axis of the brake cylinder. The included angle between the surfaces 90 and 92 is thus from 164°–168°.

Further, referring to FIGURE 4, when fluid pressure is introduced into the service cylinder 40 upon brake application the plungers 44 and 46 are forced outwardly and thereby displace the brake shoes 16 and 18 against the rotating brake drum 12 which in the instance of FIGURE 4 rotates in the direction indicated by the arrow. When the brake shoes are seated in the drum they are forced to shift circumferentially a limited distance with the drum. In the instance illustrated in FIGURE 4, brake shoe 16 shifts towards the power cylinder 42 and the brake shoe web end which is fitted in the slot 66 of the power piston 50 pushes the piston 50 inwardly thereby developing pressure in compression chamber 54 which is conveyed through outlet 55 into the secondary brake system of the vehicle to actuate other brakes.

Throughout this brake shoe movement the shoe remains substantially positively centered on the piston due to the action of the tangential surfaces 90 and 92. The point of contact $y$ between the surface 92 and the curved surface 74 of the slot 66 slides along the latter to the point $y'$ on an arc $z$ which is substantially concentric with the drum circumference. Surfaces 90 and 74 which contact at point $x$ when the brake is released must move apart when the brake is engaged so that on release of pressure, the piston 62 can return the brake shoe without binding into the drum. This novel connection between the brake shoes and the power cylinder pistons prevents the undesirable effect of wedging the shoes into the drum which occurs with other slotted or pivoted brake shoe piston connections. At the same time this connection effects an improved lining wear distribution by not gliding off-center during actuation.

The foregoing condition will be preserved throughout the range of lining wear and subsequent brake shoe adjustments.

Thus, an improved connection between the brake shoes and the power cylinder pistons in an internal drum brake has been provided which assures a definite relation of the brake shoe on the piston during all stages of actuation.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a brake mechanism comprising a service cylinder having a pair of opposed service pistons, a power cylinder having a pair of opposed power pistons, said service cylinder and said power cylinder being parallel and closely adjacent to each other, a pair of brake shoes having webs, means mounting said shoes for limited circumferential shifting movement within a surrounding drum, means connecting the webs of said shoes to said service pistons for actuation thereby, said shoes being shifted circumferentially of said drum upon engagement with said drum, and a web-power piston connection comprising an arcuate web contacting surface on the end of said power piston and a straight piston contacting surface on said web, said straight surface contacting said arcuate surface tangentially and the point of contact between said web and said power piston shifting along said arcuate surface of said power piston on an arc substantially concentric with said drum as said shoes are shifted circumferentially of said drum during brake actuation.

2. For use in a brake mechanism comprising a service cylinder having a pair of opposed service pistons, a power cylinder having a pair of opposed power pistons, said service cylinder and said power cylinder being parallel and closely adjacent to each other and mounted within a surrounding drum and in which a pair of brake shoes are mounted for limited circumferential shifting movement within said surrounding drum, said brake shoes being connected to said service pistons for actuation thereby and in which arcuate web contacting surfaces are provided on the ends of said power pistons: a special brake shoe for coaction with said service pistons and said power pistons, said shoe having a web surface for connection to said service piston, said web having an end formation adapted to contact an arcuate surface of said power piston, said end formation comprising a shallow straight-sided V notch, the included angle formed by the sides of said notch being from 164° to 168° and the point of contact between said end formation and said power piston shifting along said arcuate surface of said power piston during brake actuation along an arc substantially concentric with the surface of said drum.

3. In the brake mechanism according to claim 1 wherein said arcuate surface on the end of said piston is formed on a radius having its center at the center of said power cylinder.

4. The brake mechanism according to claim 1 wherein said straight surface is formed at an angle from 82° to 84° with respect to the axis of said power cylinder.

References Cited

UNITED STATES PATENTS

| | | | |
|---|---|---|---|
| 1,660,481 | 2/1928 | Down | 188—152 |
| 1,963,969 | 6/1934 | Burnett | 188—78 |
| 2,022,254 | 11/1935 | Pentz | 188—78 |
| 2,084,388 | 6/1937 | Dodge | 188—152 |

FOREIGN PATENTS

| | | |
|---|---|---|
| 388,446 | 3/1933 | Great Britain. |
| 761,945 | 7/1951 | Germany. |
| 1,016,136 | 9/1957 | Germany. |

MILTON BUCHLER, *Primary Examiner.*

B. S. MOWRY, *Assistant Examiner.*